United States Patent
Lutzka et al.

(10) Patent No.: US 8,226,170 B2
(45) Date of Patent: Jul. 24, 2012

(54) PIVOTING HEADREST WITH CABLE OPERATED RELEASE CATCH

(75) Inventors: Tavis Lutzka, Davisberg, MI (US); Stephen Bruck, Howell, MI (US); Stanley D. Pacolt, Clarkston, MI (US); Mark L. Gleason, Lake Orion, MI (US); David L. Quittschreiber, Milford, MI (US); Jason Hamilton, Highland, MI (US); Craig Thompson, Ortonville, MI (US)

(73) Assignee: BAE Industries, Inc., Warren, MI (US)

( * ) Notice: Subject to any disclaimer, the term of this patent is extended or adjusted under 35 U.S.C. 154(b) by 381 days.

(21) Appl. No.: 12/611,346

(22) Filed: Nov. 3, 2009

(65) Prior Publication Data

US 2010/0133889 A1    Jun. 3, 2010

Related U.S. Application Data

(63) Continuation-in-part of application No. 12/269,950, filed on Nov. 13, 2008, now Pat. No. 8,002,356.

(51) Int. Cl.
*B60N 2/48* (2006.01)

(52) U.S. Cl. ........... 297/408; 297/403

(58) Field of Classification Search ......... 297/403, 297/408, 216.12
See application file for complete search history.

(56) References Cited

U.S. PATENT DOCUMENTS

| | | | |
|---|---|---|---|
| 4,596,403 A * | 6/1986 | Dieckmann et al. | 297/408 |
| 4,796,953 A | 1/1989 | Pereira | |
| 5,484,189 A | 1/1996 | Patterson | |
| 5,590,933 A | 1/1997 | Andersson et al. | |
| 5,681,079 A | 10/1997 | Robinson | |
| 5,927,804 A | 7/1999 | Cuevas | |
| 6,000,760 A * | 12/1999 | Chung | 297/408 |
| 6,024,405 A | 2/2000 | MacAndrew et al. | |
| 6,045,181 A | 4/2000 | Ikeda et al. | |
| 6,050,633 A * | 4/2000 | Droual | 297/61 |
| 6,074,011 A | 6/2000 | Ptak et al. | |
| 6,192,565 B1 | 2/2001 | Tame | |
| 6,270,161 B1 | 8/2001 | De Filippo | |
| 6,612,653 B2 | 9/2003 | Takata | |
| 6,702,385 B2 | 3/2004 | Holdampf et al. | |
| 6,726,283 B2 | 4/2004 | Schambre et al. | |
| 6,880,890 B1 | 4/2005 | DeBrabant | |

(Continued)

FOREIGN PATENT DOCUMENTS

EP    2039562 A1    3/2009
(Continued)

*Primary Examiner* — Peter R. Brown
(74) *Attorney, Agent, or Firm* — Gifford, Krass, Sprinkle, Anderson & Citkowski, P.C.

(57) ABSTRACT

A pivoting headrest assembly including a bracket supported upon a seatback frame. A headrest support secures a bun and is pivotally secured to the bracket in a forward biased direction. A sector is pivotally secured to the bracket and to which is attached the headrest support. A release catch is pivotally supported at a further location of the bracket and is biased in a first upward direction so that the catch abuts a projecting pin associated with the sector in an upright design position established by the headrest support. A cable is secured to a support fixed to a side of the bracket and engages the catch at a location offset from its pivot axis relative to the bracket. Upon displacement of the cable, the catch is actuated out of engagement with the sector, resulting in the headrest support pivoting relative to the seatback.

18 Claims, 8 Drawing Sheets

U.S. PATENT DOCUMENTS

| | | |
|---|---|---|
| 6,935,696 B2 | 8/2005 | Gauthier et al. |
| 7,048,334 B2 | 5/2006 | Pal et al. |
| 7,066,545 B2 | 6/2006 | Terada et al. |
| 7,118,174 B2 | 10/2006 | Lee |
| 7,140,687 B2 | 11/2006 | Hoekstra et al. |
| 7,226,124 B2 | 6/2007 | Mori et al. |
| 7,234,778 B1 | 6/2007 | Toba |
| 7,322,646 B2 | 1/2008 | Jammalamadaka et al. |
| 7,325,877 B2 | 2/2008 | Brockman et al. |
| 7,341,312 B2 | 3/2008 | Gauthier et al. |
| 7,350,859 B2 | 4/2008 | Klukowski |
| 7,367,626 B2 | 5/2008 | Lawall et al. |
| 7,422,280 B2 | 9/2008 | Brockman |
| 7,429,082 B2 | 9/2008 | Kraft et al. |
| 7,543,891 B2 | 6/2009 | Chung |
| 7,575,282 B2 * | 8/2009 | Sutter et al. .................. 297/403 |
| 7,681,955 B2 | 3/2010 | Seo |
| 2001/0002764 A1 | 6/2001 | Fischer et al. |
| 2005/0225146 A1 | 10/2005 | Sutter et al. |
| 2006/0012233 A1 | 1/2006 | Karlberg |
| 2006/0250017 A1 | 11/2006 | Otto et al. |
| 2007/0236070 A1 | 10/2007 | Brockman |
| 2008/0001456 A1 | 1/2008 | Muller et al. |
| 2008/0036250 A1 | 2/2008 | Kim |
| 2009/0152924 A1 | 6/2009 | Kim et al. |
| 2009/0167066 A1 | 7/2009 | Mori et al. |
| 2009/0261635 A1 | 10/2009 | Yamaguchi et al. |
| 2010/0052379 A1 | 3/2010 | Otsuka |

FOREIGN PATENT DOCUMENTS

| | | |
|---|---|---|
| EP | 2106963 A1 | 10/2009 |
| EP | 2116416 A1 | 11/2009 |
| GB | 2432784 A | 6/2007 |
| JP | 2009202785 A | 9/2009 |

* cited by examiner

PIVOTING HEADREST WITH CABLE OPERATED RELEASE CATCH

CROSS REFERENCE TO RELATED APPLICATIONS

The present application is a continuation-in-part of U.S. Ser. No. 12/269,950, filed Nov. 13, 2008, and entitled Pivoting Headrest with Cain Release.

FIELD OF THE INVENTION

The present invention relates generally to pivoting or foldable headrest assemblies. More specifically, the present invention discloses a pivoting headrest assembly incorporating a cable operated and pivotal release catch which displaces out of supporting engagement with a pin extending from an offset pivot point of a spring loaded release sector. A pivot rod and pair of spaced apart and bun supporting headrest supports are slaved to the release sector and, upon pivotal disengagement of the catch, are pivoted from an upright design to a forward rotated position, such as to allow a rear row seat to be dumped without the headrest colliding with a forward positioned seat.

BACKGROUND OF THE INVENTION

The prior art is documented with numerous examples of folding headrest restraint mechanisms. One known purpose of such mechanisms is to reduce an overall height profile of a rear foldable seat, in particular so that the seat can be forwardly dumped (and selectively forwardly rotated) in a fashion so that it does not interfere with a forwardly located seat.

Examples of such headrest folding mechanisms include that disclosed in Robinson U.S. Pat. No. 5,681,079, and which includes a headrest latch mechanism operable in a locked mode for releasably latching a headrest in an upright/use position, as well as in a released mode for permitting movement of the headrest toward a forward dump position. A separate latch release mechanism is employed to permit the headrest latch mechanism to be selectively shifted from the locked mode into the released mode. In a preferred application, the latch release mechanism interconnects the headrest latch mechanism to a seatback latch mechanism such that the headrest latch mechanism is released upon the seatback latch mechanism being shifted to an unlatched mode, and due to actuation of the latch release mechanism.

Another example of an articulating head restraint mechanism is set forth in Gautheir U.S. Pat. No. 6,935,696, and which discloses an armature with a cam. The cam includes a lock acumination (point tapering) and a stop acumination. The armature fits within a structure composed of a bracket and a slave bracket. A slide, attached to a cable, rides within a slot on the bracket. When the slide is in a locked position, the tapered acumination of the cam presses against the slide, thereby restraining its movement. Upon sufficient force being applied to the cable, the slide moves within the slot to an unlocked position, at which point a torsion spring wrapped around the armature causes the armature to rotate to a forward stowed position.

Other noteworthy examples of foldable headrest restraints include those set forth in U.S. Pat. No. 7,325,877 (Brockman), 2005/0225146 Sutter, Jr. and 2007/0236070 (Brockmen).

SUMMARY OF THE INVENTION

The present invention discloses a pivoting headrest assembly including a bracket supported upon a seatback frame. A headrest support secures a bun and is pivotally secured to the bracket in a forward biased direction. A sector is also pivotally supported upon the bracket and to which is slaved the headrest support.

A release catch is pivotally supported upon the bracket and is biased in a first upward direction so that a forward configured edge of the catch abuts a projecting pin location associated with the sector (such pin located a spaced distance from the sector pivot axis about the bracket) and in an upright design position established by the headrest support. A cable is secured to a support fixed to a side of the bracket, with an inner translating portion engaging the catch at a location offset from its pivot axis relative to the bracket.

Upon inward displacement of the translating portion, this being towards a fixed outer sheath of the cable secured to the bracket mounted support, the catch is actuated downwardly against its biasing force (such as provided by a modified clock spring). Upon the forward configured edge of the catch pivoting out of engagement with the sector pin, the forwardly biased sector and slaved headrest supports are free to pivot a determined angular displacement, corresponding to either or both of the headrest bun contacting the seatback cushion and/or a configured upper edge of the sector contacting an upper angled stop tab associated with the bracket.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
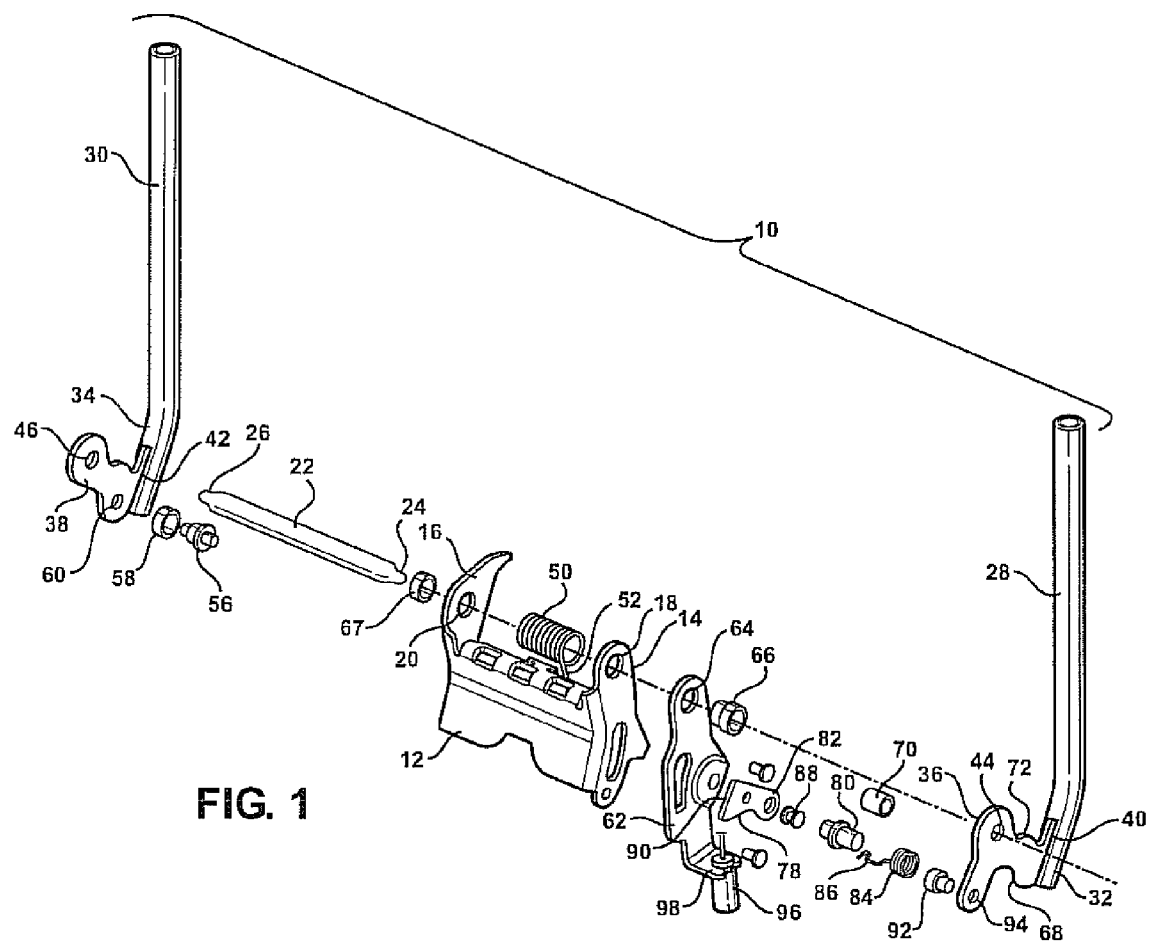
FIG. 1 is an exploded view of the pivoting headrest assembly according to the present invention.

Referring now to FIG. 1 an exploded view is generally referenced at 10 of a pivoting headrest assembly according to the present invention. As will be further described in reference to the various succeeding illustrations, the headrest assembly 10 is an improvement over prior art headrest designs in that it provides for improved triggering and releasing of a headrest supported bun, see at 2 in each of FIGS. 3 and 4, such as in order to reduce a total vertical dimension of a rear row seatback to avoid contacting a forward positioned seat during forward dump.

Figure 3A:
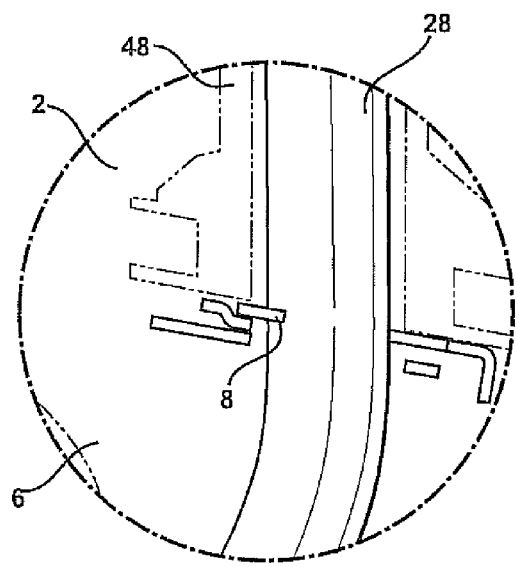
FIG. 3A is a enlarged sectional view taken from FIG. 3 and further illustrating a collar portion securing to an underside of the headrest bun and through are secured the headrest supports extending upwardly from the seatback.

A support bracket 12, such as is constructed of a steel grade material, is secured to a frame portion 4 embedded within an upper interior location of a cushion 6 (see again FIGS. 3 and 4) associated with a seatback, upon which the headrest assembly 10 is supported. As further shown in each of FIGS. 3, 3A and 4, a collar portion 8 secures to an underside of the headrest bun 2 and contacts the top of the seat back 6 when in the upright design position of FIG. 3.

The bracket 12 is constructed of a durable steel material and is again secured to the interior positioned (and upper widthwise extending) frame portion 4. The bracket 12 includes a pair of upward extending, planar shaped and spaced apart support locations (also mounting projections) and as shown at 14 and 16.

Apertures 18 and 20 (again FIG. 1) are defined in aligning fashion in the upper support locations 14 and 16, and through which extends a rotating pivot rod 22. The rod 22 is constructed of a durable steel material and includes a first keyed end 24 and a second keyed end 26, each of which projects beyond an exterior surface of an associated bracket support location 14 and 16.

A pair of elongated and spaced apart headrest supports, such as also constructed of a similar steel grade material) are referenced at 28 and 30, each exhibiting a lower most and angular shaped extending end, at 32 and 34 respectively. The configuration of the elongated supports 28 and 30 is such that, upon displacement of the headrest bun 2 (within which the supports engage) relative to the seatback cushion 6, the associated headrest bun 2 is displaced in a combined forward and downward fashion (see further headrest support position 28' in FIG. 4) so that the bun surface 2 substantially clears the seatback cushion 6.

A pair of sectors, these being shown at 36 and 38, are secured to the lower angular shaped ends 32 and 34 of the headrest supports 28 and 30. Specifically, linear extending recesses, see at 40 and 42 in FIG. 1, are defined in extending fashion from a bottom most location of each of the angularly shaped ends, and to which the sectors 36 and 38 are welded. Each of the sectors 36 and 38 exhibit a generally planar shaped and arcuately configured body, within which is defined a keyed aperture location, see at 44 and 46 (again as shown in FIG. 1), through which is seated the opposite keyed ends 24 and 26 of the pivot rod 22.

Figure 3:
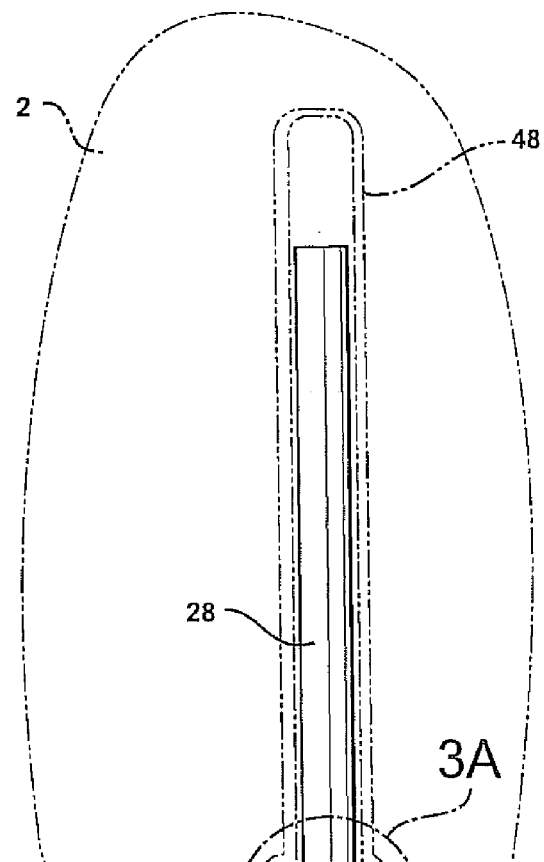
FIG. 3 is an operational side view of the headrest assembly shown in FIG. 2.
Figure 3:
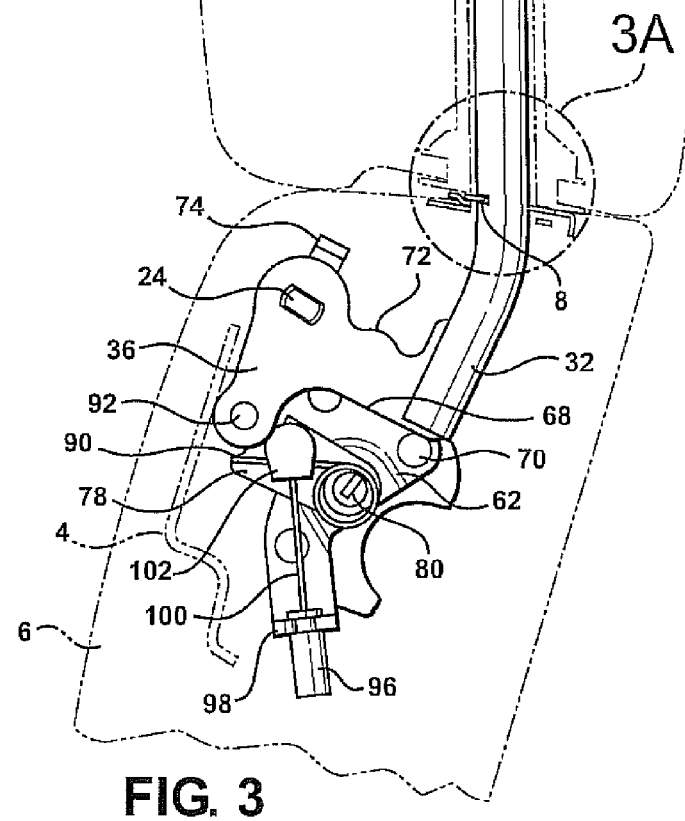
Figure 4:
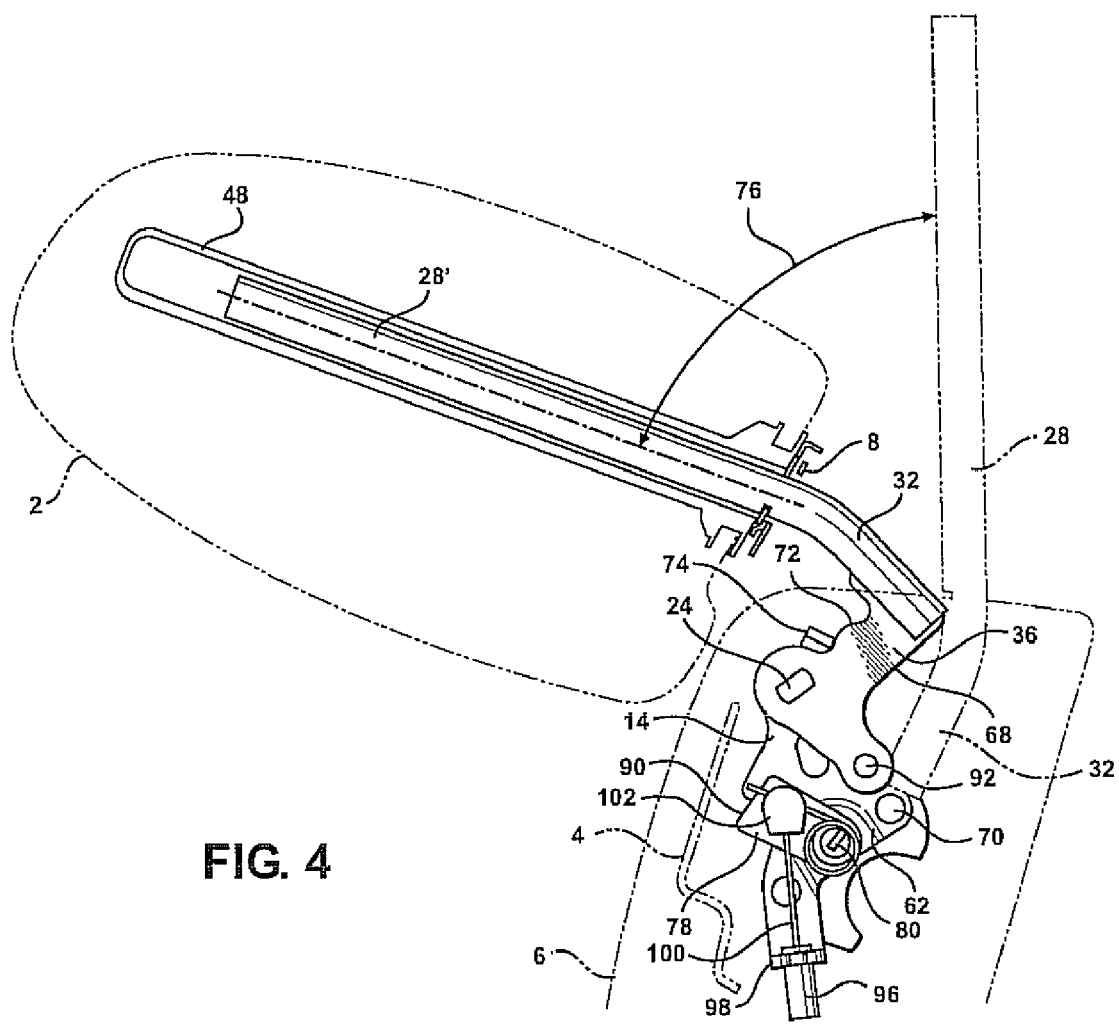
FIG. 4 is an illustration similar to FIG. 3 of the headrest in a forward pivoted dump position.

As again shown in each of FIGS. 3 and 4, the headrest supports 28 and 30 extend in a height wise fashion within interiors of outer tubular supporting portions (see at 48 associated with selected support 28), these extending from the underside positioned collar. In this fashion, the headrest bun 2 is pivotally secured in slaved fashion to the opposite keyed ends 24 and 26 of the pivot rod.

Figure 2:
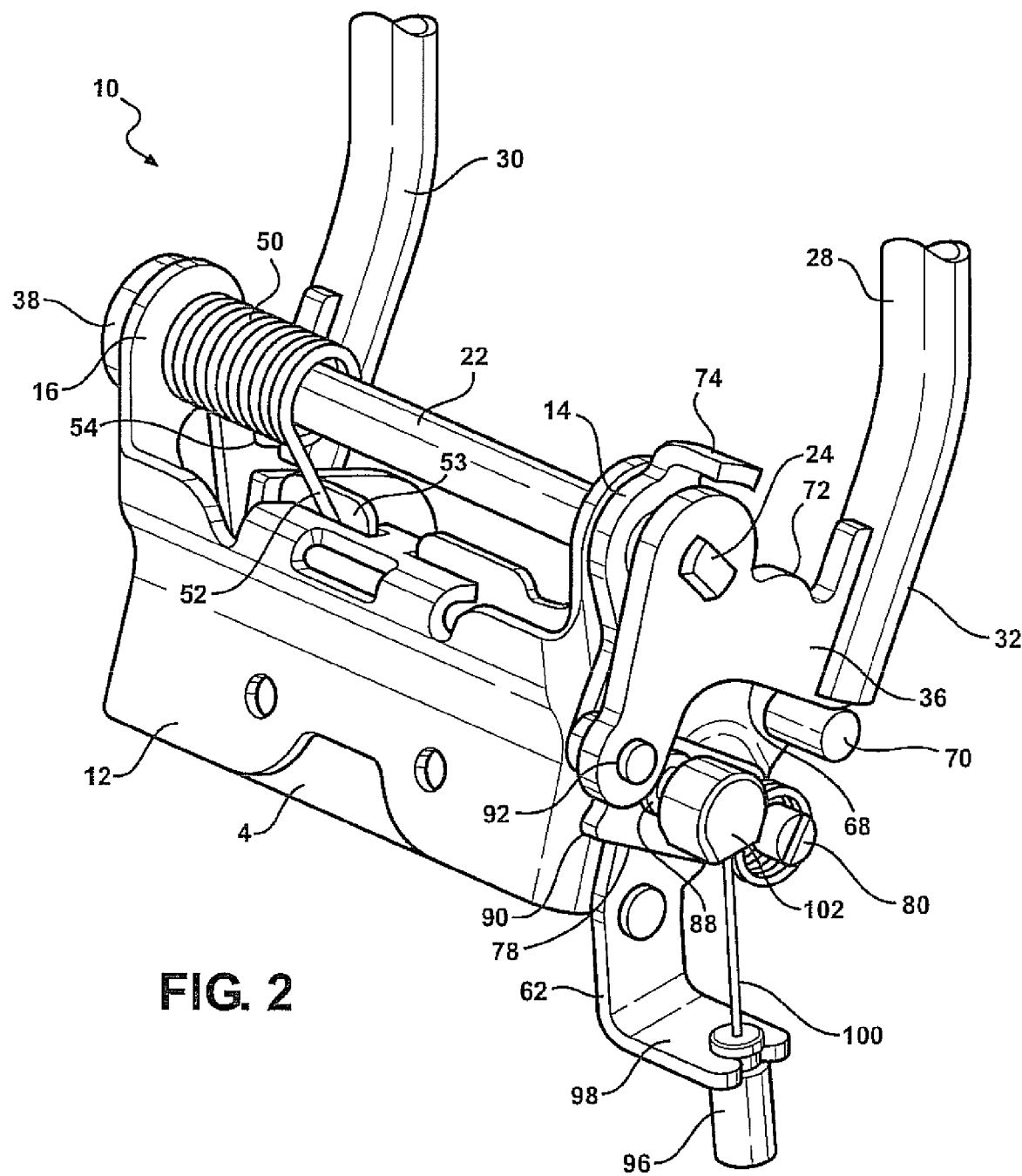
FIG. 2 is a frontal assembled perspective view of the pivoting headrest assembly in upright design position and further showing the features of the seatback frame to which the headrest bracket mount is secured.

A main coil spring 50 is supported upon the pivot rod 22 at a location between the bracket support locations 18 and 20. As best shown in FIG. 2, a first extending end 52 of the main coil spring 50 abuts against an inside surface 53 of the bracket 12. A second extending end 54 of the main coil spring 50 abuts, in an opposite rotationally biased direction, a stop pin 56 projecting from the second sector 38, this in order to influence the slaved headrest supports 28 and 30 and supported headrest bun 2 in a forward rotating and dump direction relative to the seatback 6.

Figure 5:
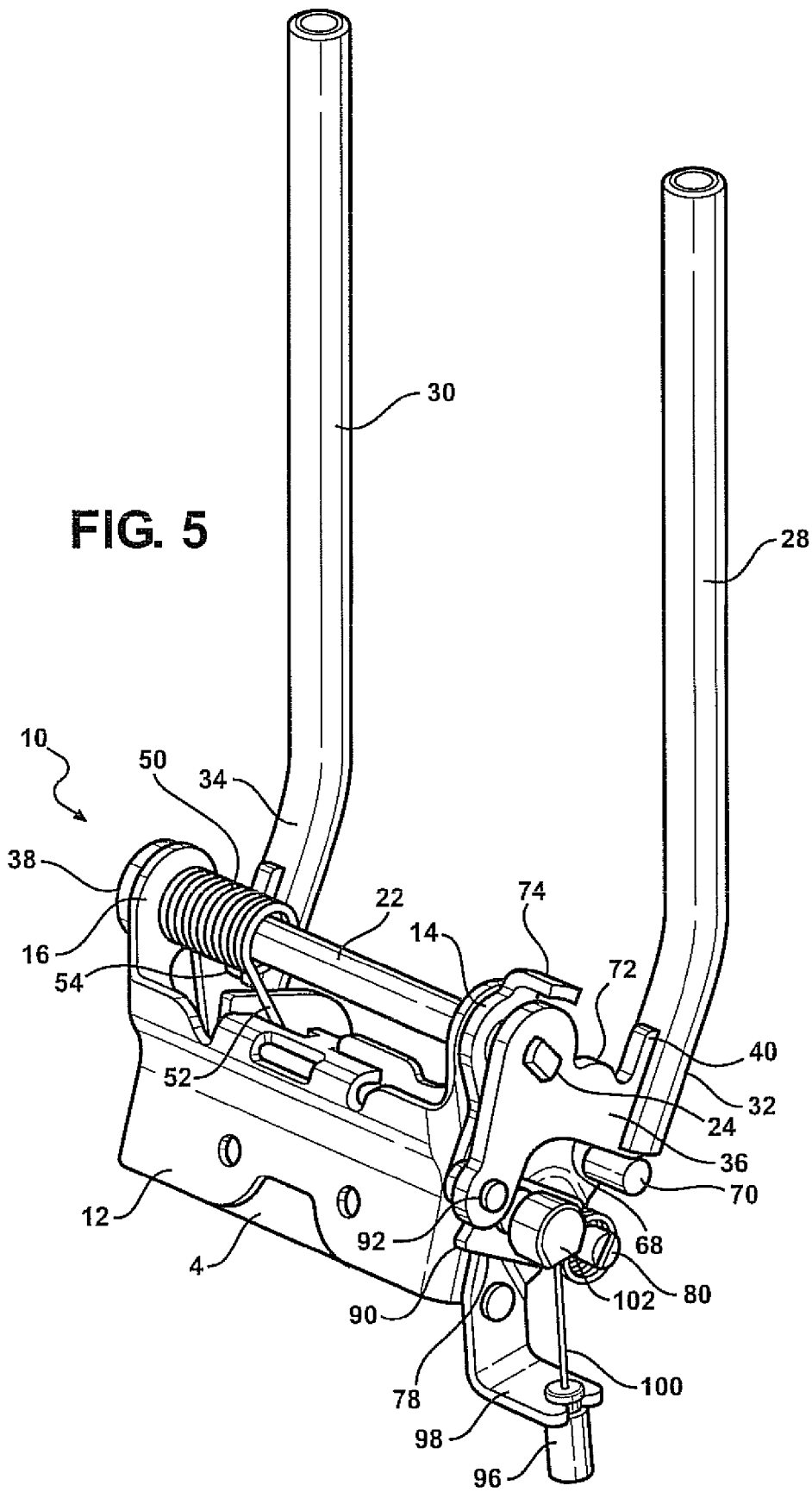
FIG. 5 is a perspective illustration of the pivoting headrest assembly similar to that shown in FIG. 2.
Figure 6:
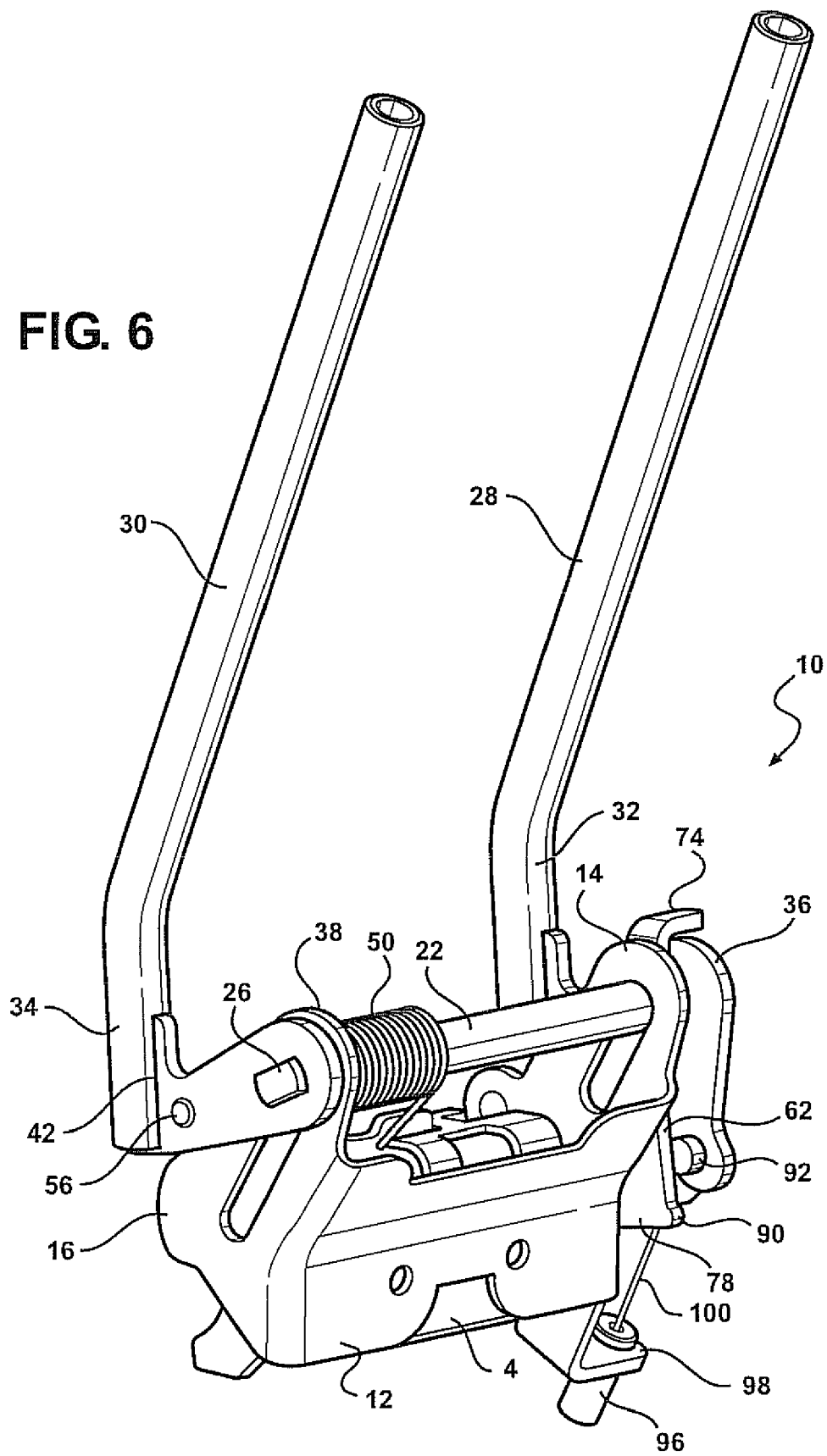
FIG. 6 is a rotated perspective illustration of the headrest assembly relative to that shown in FIG. 5.
Figure 7:
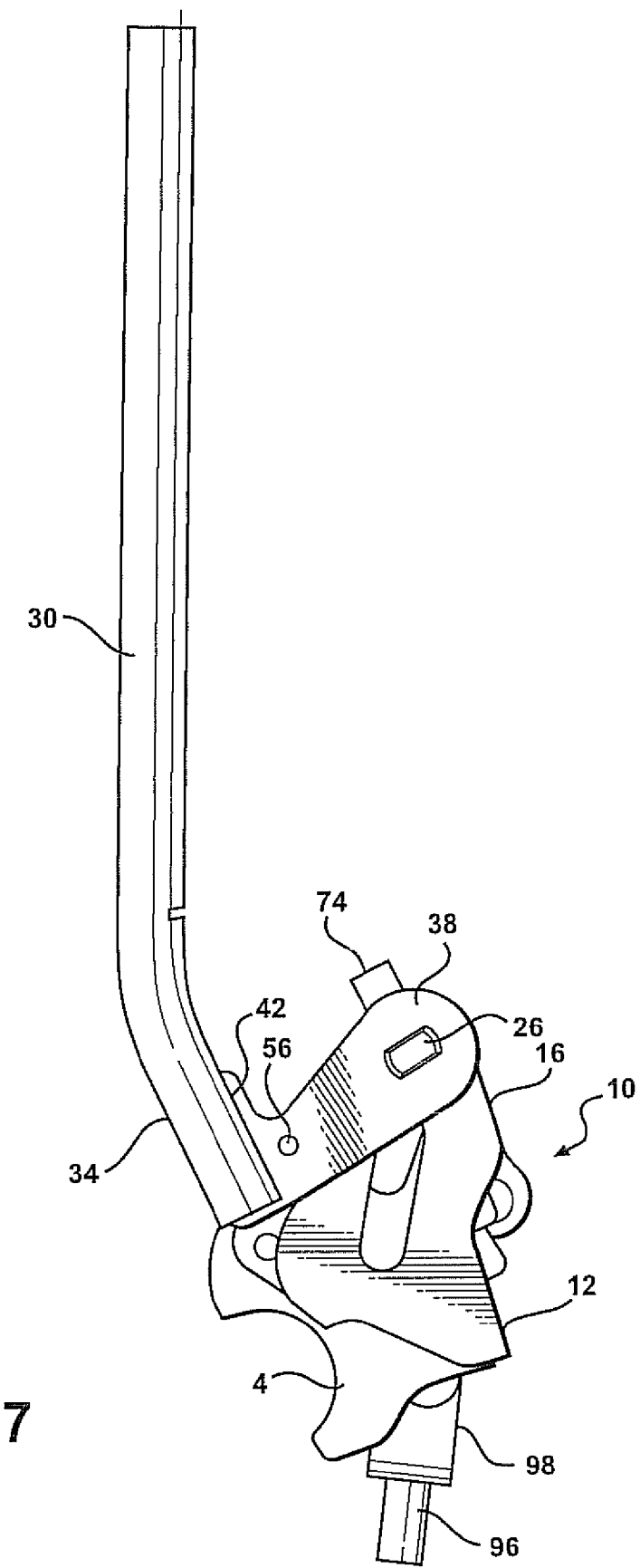
FIG. 7 is a right side plan view of the headrest assembly and illustrating the secondary sector and slaved headrest support.
Figure 8:
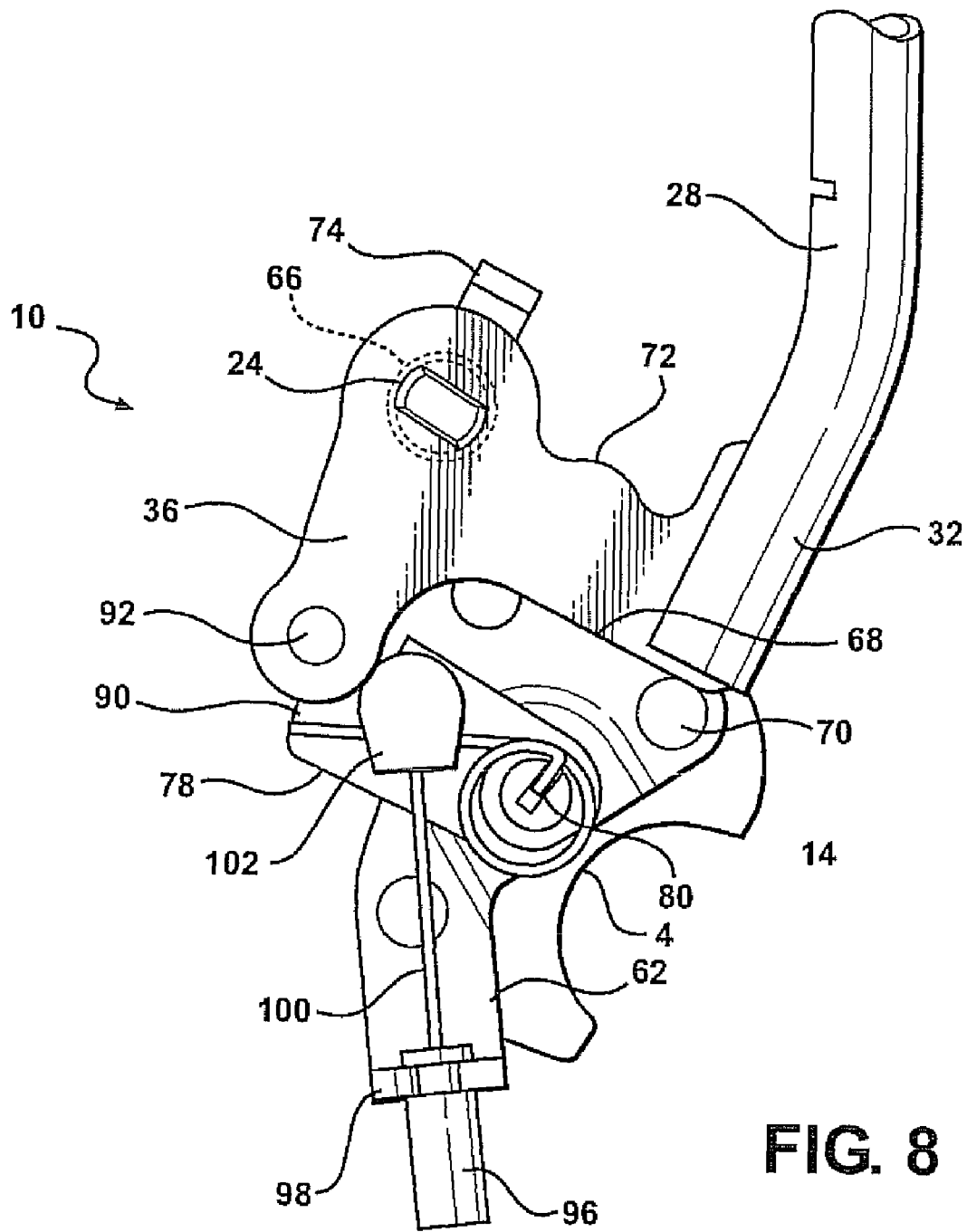
FIG. 8 is an enlarged left side plan view of the headrest assembly and further illustrating the features of the cable operated release catch and spring-biased and forward dumping seat sector.

The stop pin 56 is located a spaced distance from a pivoting coaxial support location (see keyed mounting aperture 46 in FIG. 1) and, as best shown in FIGS. 5 and 6, establishes an upper-most design position at which the stop pin 56 contacts a surface of the second bracket support location 16. As further shown in FIG. 1, a collar 58 is provided in sandwiched fashion between an inner facing surface of the second sector 38 and the stop pin 56, with the pin 56 seating within an aperture 60 defined in the second sector 38.

The first sector 36 is pivotally supported upon an exterior face of the bracket support location 14. As further shown, a cable support 62 is secured to an exterior facing surface of the first bracket support location 14 (it being also understood that the bracket 12 can be reconfigured so that the support 62 is integrally defined therewith), with the support 62 defining an inner sandwiched component between the bracket support location 14 and the pivotal sector 36. Reference is also made to aperture 64 defined at an upper end of the first sector 62, this aligning with aperture 18 in bracket support location 14 and within which is seated a support bushing 66 for assisting in spatial positioning of the sector 62 relative to the bracket support location 14 (and through which is allowed to pass the keyed end 24 of the pivot rod 22). A second support (load bearing) bushing is shown at 67 and, in combination with bushing 66, are secured to the support locations 14 and 16 of the bracket and receiving there through opposite extending ends of the pivot rod 22.

As best shown in FIG. 2, the first sector 36 exhibits a first (underside) surface 68 abutting a lateral projecting pin 70 located in outer extending fashion from the bracket support location 14 (or the cable support 62 secured in overlaying fashion to a surface of the support location 14). This corresponds to the headrest being arranged in an upright design position. A second (generally upper) surface 72 contacts an upper (outwardly) angled stop tab 74 (again FIG. 2) associated with the bracket support location 14 (or overlapping cable support 62), the location of the stop tab corresponding to the specified angular displaced position of the headrest (see again FIG. 4) and which can correspond to such as a 70° angular dump location 76 (FIG. 4).

A release catch 78 exhibits a generally planar and pseudo elongated shape and is pivotally supported, at a pivot point defined by a pivot pin 80, seating into an aperture 82 in a (rear) end of the catch 78 (again FIG. 1) and so that the release catch 78 is secured to the bracket support location 14 (via the overlapping mounted cable support 62). A modified clock spring 84 (as best again shown in FIG. 1) is mounted coaxially over the pivot pin 80 and includes an angled biasing leg 86 which seats against an underside of a rivet 88 (see FIG. 1) secured to a location of the release catch 78 spaced apart from the rear positioned pivot location 82.

The spring 84 biases the release catch 78 in a first upward direction, and so that a forward configured edge 90 of said catch abuts an inwardly projecting pin 92 secured to a further lower and forward-most location (see aperture 94 in FIG. 1) associated with the first sector 36, and in the upright design position established by the headrest support.

A cable includes a fixed outer sheath 96 secured to a lower angled portion 98 associated with the support 62 fixed to support location 14 (first side) of the bracket 12. An inner translating portion 100 of the cable engages the release catch 78 (via a cap 102 secured to an end of the inner portion 100 and which secures over the rivet 88. Upon inward displacement of the translating portion 100, the catch 78 is pivotally actuated out of engagement with the sector pin 92, this resulting in the sector 36 being released and causing the attached headrest support 28 (as well as slaved headrest support 30 via pivot rod 22) to pivot the determined angular displacement (again. FIG. 4) relative to the seatback 4.

Having described our invention, other and additional preferred embodiments will become apparent to those skilled in the art to which it pertains, and without deviating from the scope of the appended claims:

We claim:
1. A pivoting headrest assembly, comprising:
a bracket supported upon a seatback frame;
a headrest support pivotally secured to said bracket and biased in a forward rotating dump direction;
said headrest support further comprising a pair of elongated and spaced apart supports, a pivot rod extending widthwise through aligning support locations of said bracket, to which ends of said supports are mounted in slaved fashion, said bracket further comprising aligning mounting apertures defined in said spaced apart support locations through which said pivot rod extends;
a headrest bun secured to said headrest support;
said headrest supports each further comprising an angular shaped end pivotally secured to said pivot rod, actuation of said supports displacing said headrest bun in a combined forward spaced and downwardly rotating direction relative to a cushioning material surrounding the seatback frame;
a sector pivotally secured to said bracket and to which is attached said headrest support, said sector being pivotally secured to a first of said support locations, said sector having a first surface abutting a pin laterally projecting from said bracket in the upright design position, a second surface contacting an upper angled stop tab of said bracket in the angular displaced position;
a release catch pivotally secured to said bracket and being biased in a first upward direction so that a forward configured edge of said catch abuts a projecting pin associated with said sector in an upright design position established by said headrest support; and
a cable is secured to a support fixed to a side of the bracket, an inner translating portion of said cable engaging said catch at a location offset from its pivot axis relative to the bracket such that, upon inward displacement of the translating portion, said catch is actuated out of engagement with said sector pin, resulting in said sector and attached headrest support pivoting a determined angular displacement relative to said seatback.

2. The headrest assembly as described in claim 1, further comprising a pair of load bearing bushings secured to said support locations of said bracket and receiving there through opposite extending ends of said pivot rod.

3. The headrest assembly as described in claim 1, further comprising a second sector pivotally secured to a second of said support locations, said second sector including a stop pin abutting said bracket in the upright design position.

4. The headrest assembly as described in claim 1, further comprising a linear extending recess extending from a bottom edge of each of said angularly shaped ends of said headrest supports, to which first and second sectors are welded.

5. The headrest assembly as described in claim 3, further comprising a main coil spring supported upon said pivot rod at a location between said bracket support locations, a first extending end of said main coil spring abutting against an inside surface of said bracket, a second extending end of said main coil spring abutting, in an opposite rotational direction, said stop pin of said second sector at a location spaced from its pivotal axis relative said second support location such that, upon pivotal disengagement of said release catch from said slaved rotating sector, said spring influences said slaved rotating headrest supports towards said dump position.

6. The headrest assembly as described in claim 3, each of said sectors further comprising a generally planar shaped and arcuately configured body, within which is defined a keyed aperture location through which is engaged opposite keyed ends of said pivot rod.

7. A pivoting headrest assembly, comprising:
a bracket supported upon a seatback frame and having a pair of spaced apart support locations;
a pair of elongated headrest supports, a pivot rod extending widthwise through aligning apertures in said support locations and to which said headrest supports are mounted in a forward pivotally biased and slaved fashion;
a headrest bun secured to said headrest supports;
a sector pivotally secured to a first of said support locations and to which is attached a selected one of said headrest supports;
a release catch pivotally secured to said bracket, approximate said first support location, said catch being biased in a first direction to abut said sector in an upright design position established by said headrest support, said sector having a first surface abutting a pin laterally projecting from said bracket in the upright design position; and
said catch being actuated out of engagement with said sector, resulting in said sector and headrest supports pivoting a determined angular displacement relative to said seatback such that a second surface of said sector contacts an upper angled stop tab of said bracket in the angular displaced position.

8. The headrest assembly as described in claim 7, said sector further comprising a generally flattened shape with a projecting pin which abuts a forward configured edge of said release catch.

9. The headrest assembly as described in claim 7, further comprising a cable secured to a support fixed to a side of the bracket, an inner translating portion of said cable engaging a rivet secured to said catch at a location offset from its pivot axis relative to the bracket.

10. The headrest assembly as described in claim 7, said headrest supports each further comprising an angular shaped end pivotally secured to said pivot rod, actuation of said supports displacing said headrest bun in a combined forward spaced and downwardly rotating direction relative to a cushioning material surrounding the seatback frame.

11. The headrest assembly as described in claim 10, further comprising a linear extending recess extending from a bottom edge of each of said angularly shaped ends of said headrest supports, to which first and second sectors are welded.

12. The headrest assembly as described in claim 7, further comprising a pair of load bearing bushings secured to said support locations of said bracket and receiving there through opposite extending ends of said pivot rod.

13. The headrest assembly as described in claim 7, further comprising a second sector pivotally secured to a second of said support locations, said second sector including a stop pin abutting said bracket in the upright design position.

14. The headrest assembly as described in claim 13, further comprising a main coil spring supported upon said pivot rod at a location between said bracket support locations, a first extending end of said main coil spring abutting against an inside surface of said bracket, a second extending end of said main coil spring abutting, in an opposite rotational direction, said stop pin of said second sector at a location spaced from its pivotal axis relative said second support location such that, upon pivotal disengagement of said release catch from said slaved rotating sector, said spring influences said slaved rotating headrest supports towards said dump position.

15. The headrest assembly as described in claim 13, each of said sectors further comprising a generally planar shaped and arcuately configured body, within which is defined a keyed aperture location through which is engaged opposite keyed ends of said pivot rod.

16. A pivoting headrest assembly, comprising:
a bracket supported upon a seatback frame;
a headrest support pivotally secured to said bracket and biased in a forward rotating dump direction;
said headrest support further comprising a pair of elongated and spaced apart supports, a pivot rod extending widthwise through aligning support locations of said bracket, to which ends of said supports are mounted in slaved fashion;
a headrest bun secured to said headrest support;
said headrest supports each further comprising an angular shaped end pivotally secured to said pivot rod, actuation of said supports displacing said headrest bun in a combined forward spaced and downwardly rotating direction relative to a cushioning material surrounding the seatback frame;
a linear extending recess extending from a bottom edge of each of said angularly shaped ends of said headrest supports, to which first and second sectors are welded;
a sector pivotally secured to said bracket and to which is attached said headrest support;
a release catch pivotally secured to said bracket and being biased in a first upward direction so that a forward configured edge of said catch abuts a projecting pin associated with said sector in an upright design position established by said headrest support; and
a cable is secured to a support fixed to a side of the bracket, an inner translating portion of said cable engaging said catch at a location offset from its pivot axis relative to the bracket such that, upon inward displacement of the translating portion, said catch is actuated out of engagement with said sector pin, resulting in said sector and attached headrest support pivoting a determined angular displacement relative to said seatback.

17. A pivoting headrest assembly, comprising:
a bracket supported upon a seatback frame and having a pair of spaced apart support locations;
a pair of elongated headrest supports, a pivot rod extending widthwise through aligning apertures in said support locations and to which said headrest supports are mounted in a forward pivotally biased and slaved fashion;
a headrest bun secured to said headrest supports;
said headrest supports each further comprising an angular shaped end pivotally secured to said pivot rod, actuation of said supports displacing said headrest bun in a combined forward spaced and downwardly rotating direction relative to a cushioning material surrounding the seatback frame;
a linear extending recess extending from a bottom edge of each of said angularly shaped ends of said headrest supports;
a pair of sectors welded to said angularly shaped ends of said headrest supports, said sectors pivotally secured to said support locations of said bracket;
a release catch pivotally secured to said bracket, approximate said first support location, said catch being biased in a first direction to abut a first selected one of said sectors in an upright design position established by said headrest support; and
said catch being actuated out of engagement with said first selected sector, resulting in said sector and headrest supports pivoting a determined angular displacement relative to said seatback.

18. A pivoting headrest assembly, comprising:
a bracket supported upon a seatback frame, first and second spaced apart support locations extending upwardly from said bracket and between which is received a rotating pivot rod;
a pair of elongated and spaced apart headrest supports to which is secured a headrest bun;
a pair of spaced apart sectors securing to lower ends of said headrest supports and in turn pivotally mounting to said pivot rod via aligning apertures in said sectors and headrest supports through which said pivot rod extends;
a first of said sectors being biased in a forward rotating direction relative to the bracket and exhibiting a planar shaped and arcuate configured body including a first underside surface abutting a pin laterally projecting from said first support location, said first sector also including a second upper surface contacting an outwardly angled stop tab extending from said first support location an elevated location above said pin, said first sector further comprising a forward and lower most extending location to which is secured an inwardly laterally projecting pin;
a release catch pivotally secured to said first support location of said bracket and abutting said inwardly laterally projecting pin of said first sector in an upright design position established by said headrest support; and
downward rotation of said release catch disengaging from said sector pin, resulting in said headrest supports pivoting a determined angular displacement relative to said seatback to a forward folded position.

* * * * *